(12) United States Patent
Horigome et al.

(10) Patent No.: US 11,964,420 B2
(45) Date of Patent: Apr. 23, 2024

(54) BLOW MOLDING APPARATUS AND BLOW MOLDING METHOD

(71) Applicant: NISSEI ASB MACHINE CO., LTD., Nagano (JP)

(72) Inventors: Hiroshi Horigome, Nagano (JP); Toshio Nakajima, Nagano (JP)

(73) Assignee: NISSEI ASB MACHINE CO., LTD., Nagano (JP)

( * ) Notice: Subject to any disclaimer, the term of this patent is extended or adjusted under 35 U.S.C. 154(b) by 108 days.

(21) Appl. No.: 17/600,227

(22) PCT Filed: Apr. 1, 2020

(86) PCT No.: PCT/JP2020/015088
§ 371 (c)(1),
(2) Date: Sep. 30, 2021

(87) PCT Pub. No.: WO2020/204098
PCT Pub. Date: Oct. 8, 2020

(65) Prior Publication Data
US 2022/0219371 A1    Jul. 14, 2022

(30) Foreign Application Priority Data
Apr. 2, 2019 (JP) .................. 2019-070459

(51) Int. Cl.
*B29C 49/06* (2006.01)
*B29C 49/64* (2006.01)
*B29C 49/78* (2006.01)

(52) U.S. Cl.
CPC ........ *B29C 49/062* (2013.01); *B29C 49/6427* (2013.01); *B29C 49/786* (2013.01)

(58) Field of Classification Search
CPC ..... B29C 49/786; B29C 49/062; B29C 49/02; B29C 49/6427; B29C 2049/023; B29C 2049/48615; B29L 2031/7158
See application file for complete search history.

(56) References Cited

U.S. PATENT DOCUMENTS 4,846,661 A * 7/1989 Nakamura .............. B29C 49/36
425/522
5,253,999 A    10/1993 Kosuge
(Continued)

FOREIGN PATENT DOCUMENTS

JP    4-246526 A    9/1992
JP    4319863 B2    8/2009
(Continued)

OTHER PUBLICATIONS

International Search Report issued in International Patent Application No. PCT/JP2020/015088, dated Jun. 9, 2020, along with English translation thereof.
(Continued)

*Primary Examiner* — Monica A Huson
(74) *Attorney, Agent, or Firm* — Greenblum & Bernstein, P.L.C.

(57) ABSTRACT

A blow molding apparatus includes a machine bed, an upper base disposed at intervals in a vertical direction from the machine bed, a transport plate configured to rotate at a height position of the upper base to convey the preform between an injection molding part and a blow molding part, and an elevation mechanism configured to move the transport plate or the upper base up and down in the vertical direction with respect to a mold disposed on the machine bed. A support pillar includes a height adjusting part con-
(Continued)

figured to adjust a stroke of the transport plate or the upper base in the vertical direction with respect to the machine bed.

9 Claims, 9 Drawing Sheets

(56) References Cited

U.S. PATENT DOCUMENTS

2019/0152121 A1    5/2019  Horigome et al.
2019/0389117 A1   12/2019  Harigome

FOREIGN PATENT DOCUMENTS

WO    2017/142043 A1   8/2017
WO    2018/003775 A1   1/2018

OTHER PUBLICATIONS

Written Opinion of the International Searching Authority issued in International Patent Application No. PCT/JP2020/015088, dated Jun. 9, 2020, along with English translation thereof.

* cited by examiner

BLOW MOLDING APPARATUS AND BLOW MOLDING METHOD

BACKGROUND OF THE INVENTION

Field of the Invention

The present invention relates to a blow molding apparatus and a blow molding method.

Description of the Related Art

Conventionally, a hot parison type blow molding apparatus has been known as one of apparatuses for manufacturing a resin container. The hot parison type blow molding apparatus is configured to blow-mold a resin container using residual heat during injection molding of a preform, and is advantageous in that it is possible to manufacture a resin container which is diversified and excellent in aesthetic appearance as compared with a cold parison type.

Further, as a configuration of a blow molding apparatus, a rotary blow molding apparatus that blow-molds a resin container by intermittently conveying an injection-molded preform by a transport plate that is rotationally driven is well known (See, for example, Japanese Patent No. 4319863.). In this type of blow molding apparatus, an upper base that holds a transport plate and various drive mechanisms are fixed to a machine bed at intervals in the vertical direction. Then, in an injection molding part, a blow molding part, and the like of the blow molding apparatus, the transport plate moves up and down with respect to the upper base to perform processing of each step.

An axial length of the preform handled by the blow molding apparatus varies depending on the container to be manufactured. For example, when an axial length of the preform is short, the stroke of the transport plate in the vertical direction required to advance and retract the preform from each part of the blow molding apparatus can be shorter than that when the length is long.

However, in the configuration of the conventional blow molding apparatus, a stroke of the transport plate in the vertical direction is defined by interval between the position of the upper base and the machine bed, and is constant regardless of the type of the preform. That is, according to the conventional blow molding apparatus, when the axial length of the preform is short, the transport plate is reciprocated in the vertical direction more than the stroke required for advancing and retracting the preform. Therefore, depending on the type of preform, the operation time (dry cycle) of the machine becomes unnecessarily long, and thus the molding cycle of the container also becomes longer accordingly.

SUMMARY OF THE INVENTION

A blow molding apparatus according to one aspect of the present invention includes: an injection molding part configured to injection-mold a resin preform having a bottomed shape; a blow molding part configured to blow-mold the preform to manufacture a resin container; a machine bed; an upper base disposed at intervals in a vertical direction from the machine bed; a transport plate configured to rotate at a height position of the upper base to convey the preform between the injection molding part and the blow molding part; and an elevation mechanism configured to move the transport plate or the upper base up and down in the vertical direction with respect to a mold disposed on the machine bed. A support pillar includes a height adjusting part configured to adjust a stroke of the transport plate or the upper base in the vertical direction with respect to the machine bed.

Further features of the present invention will become apparent from the following description of exemplary embodiments with reference to the attached drawings.

DESCRIPTION OF THE EMBODIMENTS

Hereinafter, embodiments of the present invention will be described with reference to the drawings.

In the embodiment, for easy understanding, structures and elements other than the main part of the present invention will be described in a simplified or omitted manner. In addition, in the drawings, the same elements are denoted by the same reference numerals. Note that the shapes, dimensions, and the like of the respective elements illustrated in the drawings are schematically illustrated, and do not indicate actual shapes, dimensions, and the like.

(Blow Molding Apparatus 1)

Figure 1:
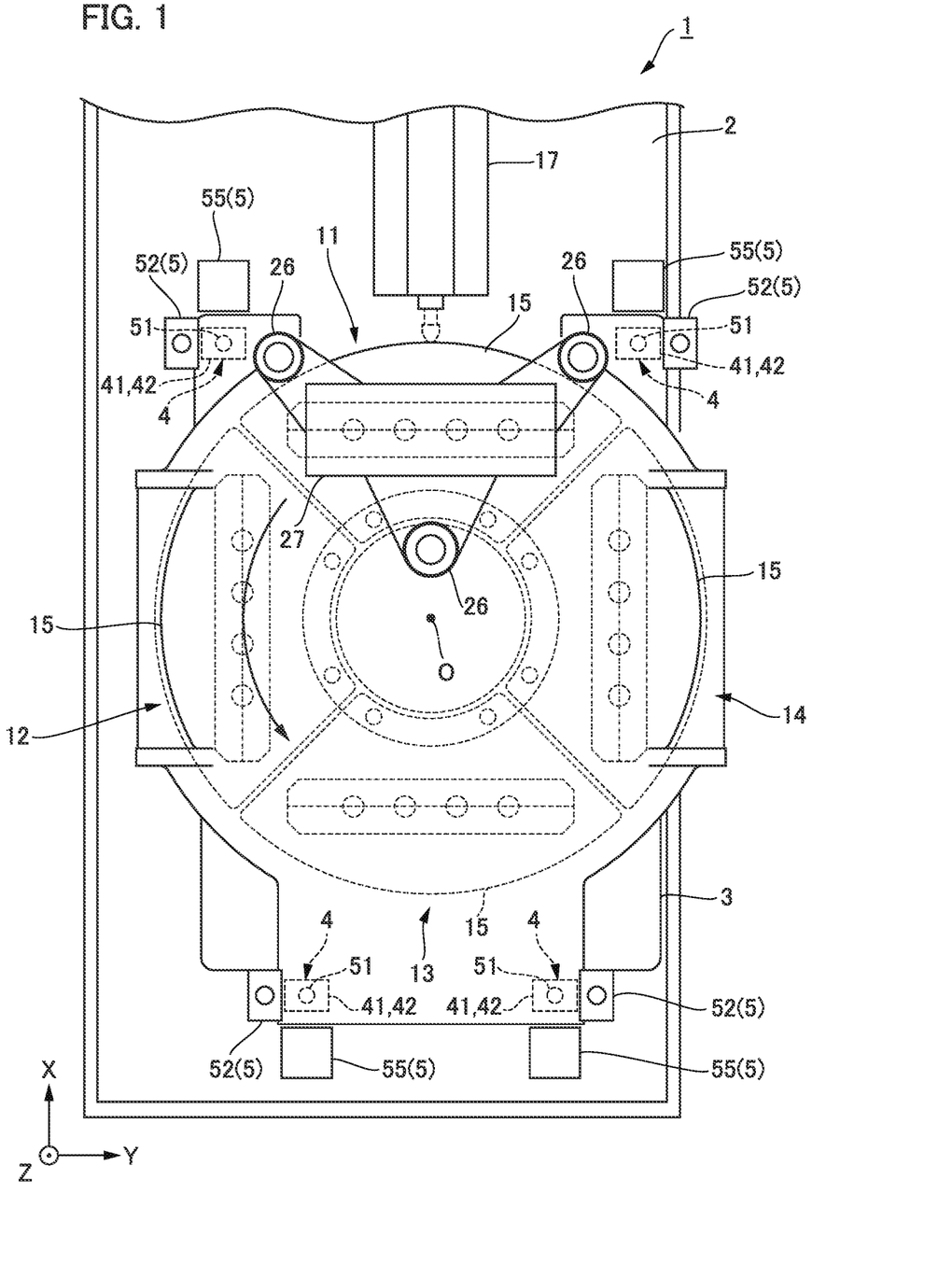
FIG. 1 is a plan view schematically illustrating a configuration of a blow molding apparatus.
Figure 2:
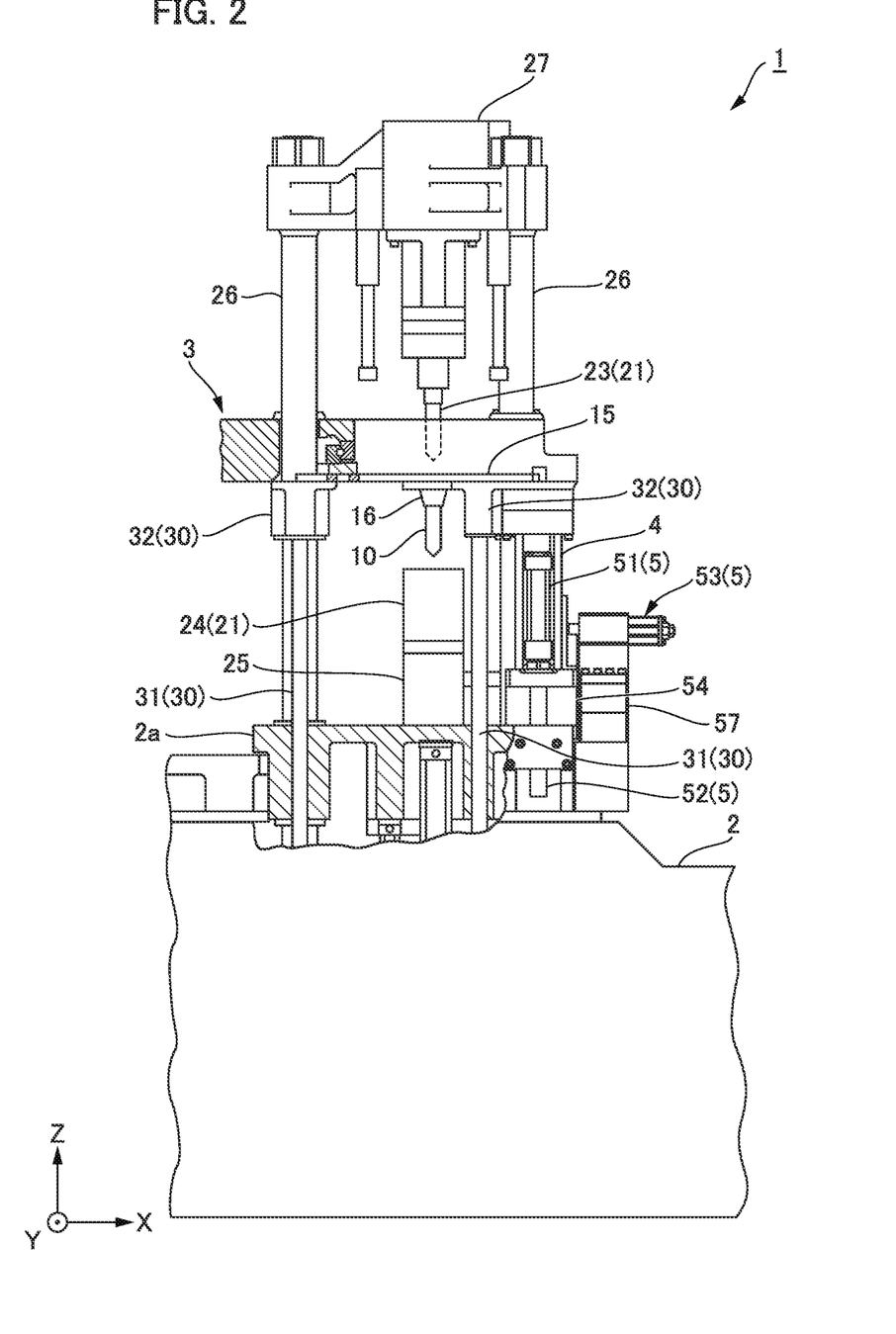
FIG. 2 is a side view of the vicinity of an injection molding part of the blow molding apparatus.

FIG. 1 is a plan view schematically illustrating a configuration of a blow molding apparatus 1 for manufacturing a resin container (Hereinafter, also referred to as a container.). FIG. 2 is a side view of the vicinity of an injection molding part of the blow molding apparatus.

The blow molding apparatus 1 according to the present embodiment is a hot parison type (also referred to as a one-stage type) apparatus that performs blow molding by utilizing residual heat (internal heat quantity) during injection molding without cooling a preform 10 to room temperature.

As illustrated in FIGS. 1 and 2, the blow molding apparatus 1 includes a machine bed 2 and an upper base 3 disposed above the machine bed 2 (Z direction in the drawing). The upper base 3 is supported by a plurality of (four) support pillars 4 erected upward from the machine bed 2. Each support pillar 4 includes a height adjusting part 5 that adjusts an interval in the vertical direction (Z direction in the drawing) between the machine bed 2 and the upper base 3.

In the blow molding apparatus 1, an injection molding part 11, a temperature adjusting part 12, a blow molding part 13, and a take-out part 14 are arranged in a space between the machine bed 2 and the upper base 3. The injection molding part 11, the temperature adjusting part 12, the blow molding part 13, and the take-out part 14 are arranged at positions rotated by a predetermined angle (for example, 90 degrees) with respect to a rotation center O of a transport plate 15 described later. Note that, in the blow molding apparatus 1, the temperature adjusting part 12 and the take-out part 14 may not be arranged.

Here, at the position of the injection molding part 11 of the upper base 3, an upper mold clamping plate 27 of the injection molding part 11 and an injection core mold 23 illustrated in FIG. 2 are arranged on the upper surface side. At the position of the temperature adjusting part 12 of the upper base 3, a heating core and an elevation mechanism of the heating core (both not shown) are arranged on the upper surface side. At the position of the blow molding part 13 of the upper base 3, a stretching rod and an elevation mechanism of the stretching rod (both not illustrated) are arranged on the upper surface side. In addition, at the position of the take-out part 14 of the upper base 3, a take-out cam (not illustrated) is disposed on the upper surface side.

Further, four fan-shaped transport plates 15 are arranged at predetermined angles (for example, 90 degrees) on the lower surface of the upper base 3 above the machine bed 2. The four transport plates 15 are guided by a plurality of receiving members 32 (see FIG. 2) fixed around the upper base 3, respectively, and intermittently circulate and move along a rotation direction with a rotation center O as a rotation axis. The preform 10 (or the container) held by the transport plate 15 is conveyed through the injection molding part 11, the temperature adjusting part 12, the blow molding part 13, and the take-out part 14 in this order by the rotation of the transport plate 15. Note that, the transport plate 15 may have a single disk shape and may not be divided for each molding part.

Further, as illustrated in FIG. 2, a neck mold 16 for holding the preform is provided on the lower surface of each transport plate 15 so that the axial direction of the preform 10 is along the vertical direction. An opening is formed on the upper surface side of the neck mold 16 in each transport plate 15, and an injection core mold 23, a blow core, the stretching rod, and the like can be inserted into the preform 10 from above through the opening.

(Injection Molding Part 11)

The injection molding part 11 includes an injection mold 21 and an elevation mechanism 30 of the transport plate 15. An injection device 17 that supplies a resin material, which is a raw material of the preform, is connected to the injection molding part 11.

The injection mold 21 includes an injection core mold 23 that defines the internal shape of the preform 10, an injection cavity mold 24 that defines the external shape of the preform 10, and a hot runner mold 25 that guides the molten resin supplied from the injection device 17 to a mold space of the injection mold 21. The injection cavity mold 24 and the hot runner mold 25 are fixed to the lower base 2a side of the machine bed 2. On the other hand, the injection core mold 23 is attached to the upper mold clamping plate 27 supported by tie bars 26, and can move up and down in the vertical direction.

The elevation mechanism 30 has a function of moving the neck mold 16 attached to the lower surface of the transport plate 15 up and down with respect to the injection cavity mold 24. The elevation mechanism 30 includes a lifting cylinder (not illustrated) that moves the receiving member 32 up and down in the vertical direction via a lifting rod 31, and is configured such that the transport plate 15 held by the receiving member 32 moves up and down in the vertical direction by the up-and-down movement of the receiving member 32. As a power source of the elevation mechanism 30, for example, a hydraulic cylinder or an air cylinder can be used. Note that, as a power source of the elevation mechanism 30, a hydraulic or toggle elevation mechanism or a ball screw mechanism by an electric motor may be used.

Here, the injection cavity mold 24 of the injection mold 21 is fixed to the lower base 2a side of the machine bed 2, and the transport plate 15 rotates at the height position of the upper base 3 to convey the preform 10. Therefore, the stroke of the transport plate 15 in the vertical direction by the elevation mechanism 30 when advancing and retracting the preform 10 with respect to the injection mold 21 is defined by the interval in the vertical direction between the machine bed 2 or the lower base 2a and the upper base 3.

The injection molding part 11 closes the injection cavity mold 24, the injection core mold 23, and the neck mold 16 of the transport plate 15 to form a preform-shaped mold space. Then, by pouring the resin material from the injection device 17 into such a preform-shaped mold space, the preform 10 is manufactured by the injection molding part 11.

Note that, also when mold opening of the injection molding part 11 is performed, the neck mold 16 of the transport plate 15 is not opened and directly holds and conveys the preform 10. The number (That is, the number of containers that can be simultaneously molded by the blow molding apparatus 1) of the preforms 10 simultaneously molded by the injection molding part 11 can be appropriately set. As an example, FIG. 1 illustrates a configuration in which four preforms are conveyed.

(Temperature Adjusting Part 12)

The temperature adjusting part 12 includes a mold unit (conditioning pot and conditioning rod) for temperature adjustment (not illustrated) and an elevation mechanism (not illustrated) of the mold unit. The temperature adjusting part 12 performs temperature equalization and removal of non-uniform temperature of the preform 10 manufactured by the injection molding part 11 using the conditioning pot, and adjusts the temperature of the preform 10 to a blow temperature (for example, about 90° C. to 105° C.) suitable for final blow. In addition, the temperature adjusting part 12 of the present embodiment also has a function of cooling the high temperature preform 10 after injection molding. Note that, the temperature adjusting part 12 may also include an elevation mechanism (not shown) of the transport plate 15 having the same configuration as the injection molding part 11.

(Blow Molding Part 13)

The blow molding part 13 includes a blow-molding mold (a blow mold and a bottom mold), a stretching rod, a blow-air introducing member, and an elevation mechanism of the transport plate 15 (all not illustrated). The blow molding part 13 stretches the preform 10 disposed in the blow-molding mold in the axial direction with a stretching rod, and introduces high-pressure air into the preform to perform biaxial stretching blow molding, thereby manufacturing a container.

(Take-Out Part 14)

The take-out part 14 opens the neck mold 16 with the take-out cam, and takes out the container manufactured by the blow molding part 13 from the blow molding apparatus 1. The container taken out by the take-out part 14 is boxed or conveyed to the filling line. Note that, the take-out part 14 may also include an elevation mechanism (not illustrated) of the transport plate 15 having the same configuration as the injection molding part 11.

(Support Pillar 4, Height Adjusting Part 5)

Figure 3:
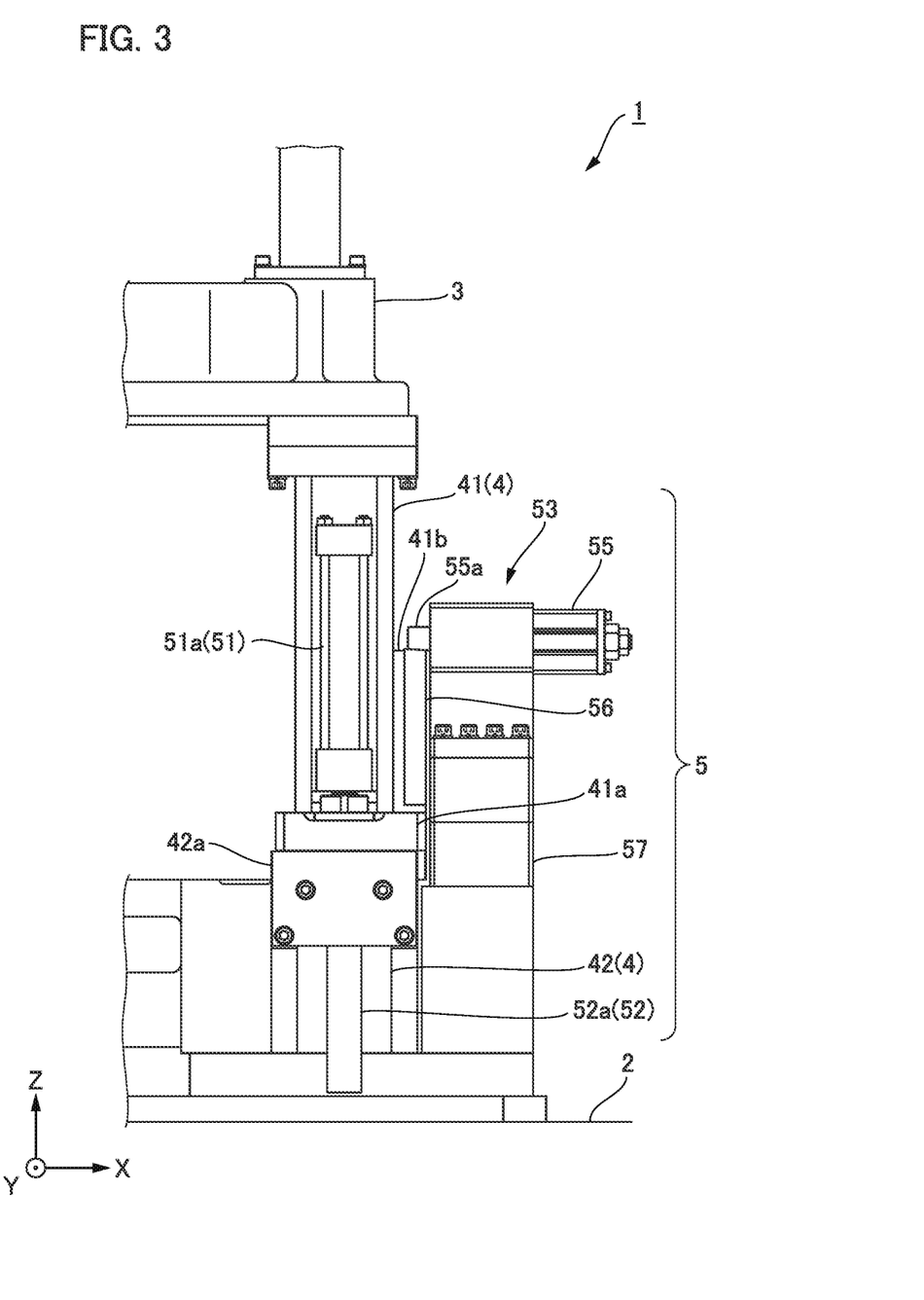
FIG. 3 is a view illustrating a configuration example of a support pillar and a height adjusting part in a non-extended state.
Figure 4:
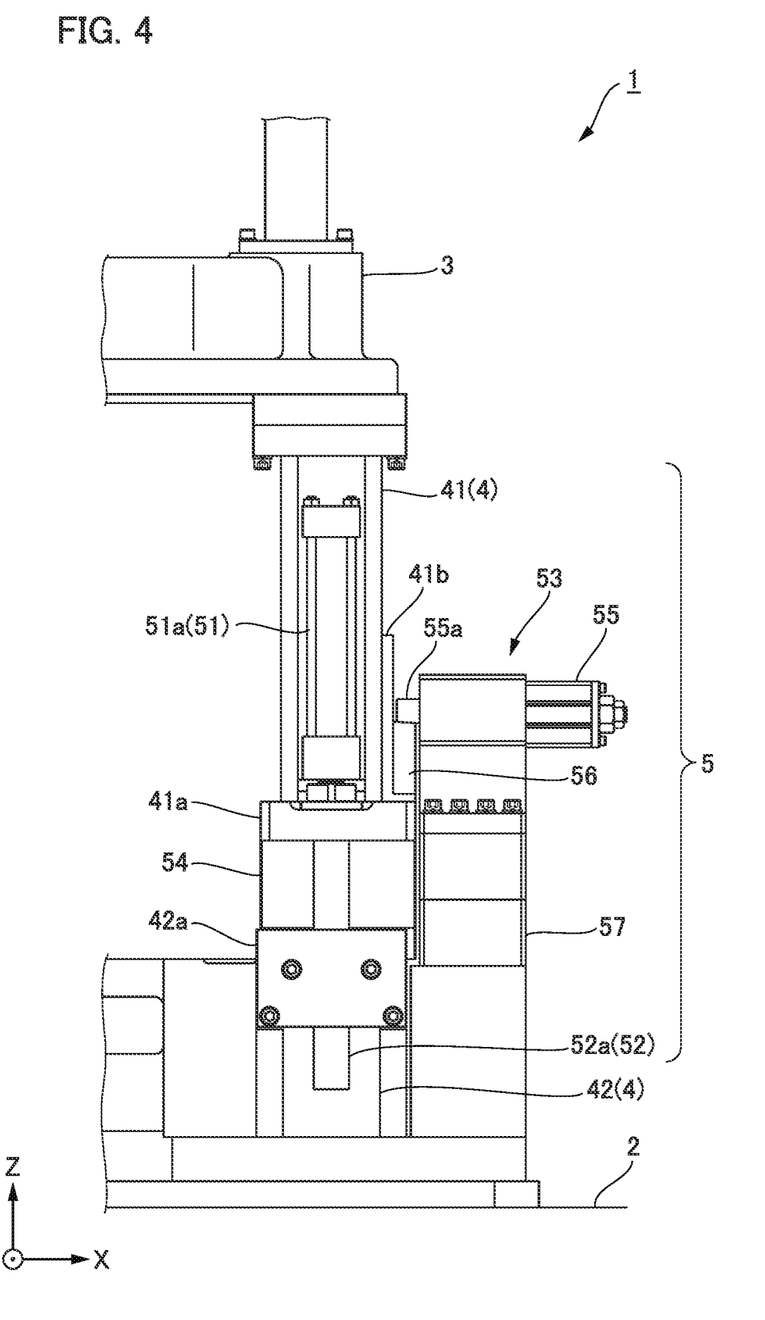
FIG. 4 is a view illustrating a configuration example of the support pillar and the height adjusting part in a extended state.
Figure 5A:
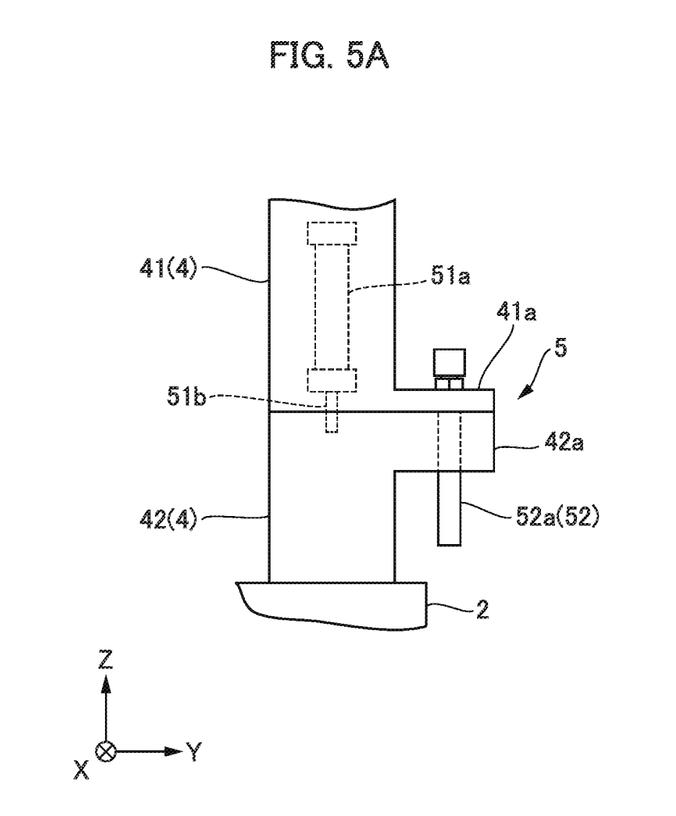
FIGS. 5A and 5B are views schematically illustrating a hydraulic cylinder and a guide mechanism of the height adjusting part.
Figure 5B:
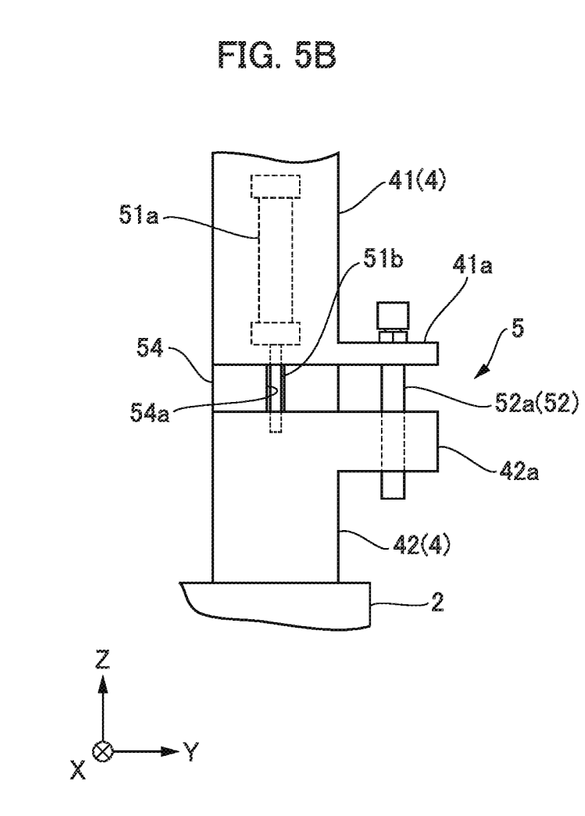

FIG. 3 is a diagram illustrating a configuration example of the support pillar 4 and the height adjusting part 5 in the non-extended state. FIG. 4 is a diagram illustrating a configuration example of the support pillar 4 and the height adjusting part 5 in the extended state. FIGS. 5A and 5B are diagrams schematically illustrating a hydraulic cylinder and a guide part of the height adjusting part.

Note that, since the configurations of the four pairs of support pillars 4 and the height adjusting parts 5 in the present embodiment are common, the configuration of one pair of support pillar 4 and the height adjusting part 5 will be described, and redundant description will be omitted.

As illustrated in FIGS. 3 and 4, each of the support pillars 4 includes an upper support pillar 41 and a lower support pillar 42 arranged along the vertical direction. The upper support pillar 41 is connected to the lower side of the upper base 3, and has a pedestal 41a protruding laterally at the lower end side. The lower support pillar 42 is erected on the machine bed 2. The upper support pillar 41 and the lower support pillar 42 are connected in the vertical direction by a cylinder rod 51b and a guide part 52 described later. In the non-extended state shown in FIGS. 3 and 5A, the upper end surface of the lower support pillar 42 is configured to receive the lower end surface of the upper support pillar 41.

The height adjusting part 5 includes a hydraulic cylinder 51 as an example of a drive part, a guide part 52 that guides the upper support pillar 41 in the vertical direction, and a locking part 53 that fixes the position of the upper support pillar 41 in the vertical direction.

The hydraulic cylinder 51 includes a cylinder body 51a fixed inside the upper support pillar 41 and a cylinder rod 51b extending below the cylinder body 51a. As shown in FIGS. 5A and 5B, the cylinder rod 51b is connected to the upper end surface of the lower support pillar 42, and expands and contracts in the vertical direction by the hydraulic pressure of the cylinder body 51a. Therefore, the upper support pillar 41 can be moved in the vertical direction by the hydraulic cylinder 51.

As shown in FIGS. 5A and 5B, the guide part 52 is disposed on one side surface of the upper support pillar 41 and the lower support pillar 42. In addition, as illustrated in FIGS. 3 and 4, the locking part 53 is disposed on another side surface of the upper support pillar 41 and the lower support pillar 42 different from the side surface on which the guide part 52 is disposed.

The guide part 52 includes a guide rod 52a disposed along the vertical direction. The guide rod 52a is fixed to the pedestal 41a of the upper support pillar 41 and is attached so as to penetrate a guide block 42a fixed to the lower support pillar 42. The guide rod 52a is slidable with respect to the guide block 42a. Therefore, the movement of the upper support pillar 41 in the horizontal direction (XY direction in the drawing) is restricted by the guide rod 52a, and the upper support pillar 41 is stably movable only in the vertical direction.

Figure 6A:
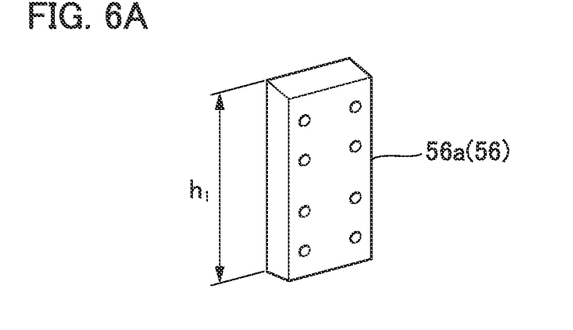
FIGS. 6A to 6C are views showing a configuration example of a stopper member and a spacer member.
Figure 6B:
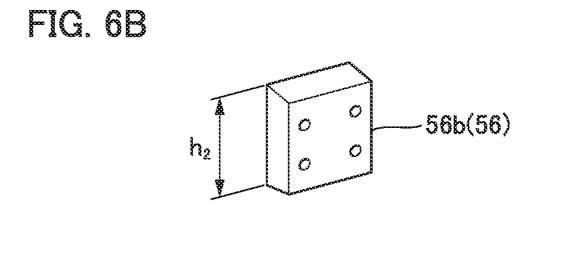
Figure 6C:
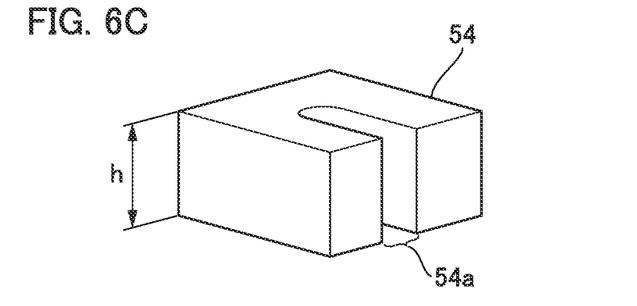

In the extended state shown in FIGS. 4 and 5B, a spacer member 54 that defines an interval in the vertical direction between the machine bed 2 and the upper base 3 is inserted between the upper end surface of the lower support pillar 42 and the lower end surface of the upper support pillar 41. As shown in FIG. 6C, the spacer member 54 is a block having a rectangular shape overall, and a groove portion 54a extending in the vertical direction is formed on one side surface portion. The width of the groove portion 54a of the spacer member 54 is set larger than the diameter of the cylinder rod 51b.

Note that, for the spacer member 54, a member having an arbitrary height h can be selected from a plurality of types having different heights in the vertical direction so that the stroke of the transport plate 15 in the vertical direction has an appropriate dimension for advancing and retracting the preform 10.

When the spacer member 54 is attached, the spacer member 54 is horizontally inserted into a gap between the upper support pillar 41 and the lower support pillar 42 formed by the operation of the hydraulic cylinder 51, and the spacer member 54 is disposed such that the cylinder rod 51b is sandwiched between the groove portions 54a. By disposing the spacer member 54 between the upper support pillar 41 and the lower support pillar 42, the interval in the vertical direction between the machine bed 2 and the upper base 3 can be adjusted by the height h of the spacer member 54.

The locking part 53 includes a lock cylinder 55 and a stopper member 56.

The lock cylinder 55 is fixed to a support base 57 so as to face the second side surface of the upper support pillar, and expands and contracts a rod 55a serving as a stopper in the horizontal direction toward the side surface of the upper support pillar 41. In a state in which the rod 55a of the lock cylinder 55 is expanded, the position of the upper support pillar 41 in the vertical direction is fixed by the rod 55a being engaged with the stopper member 56. On the other hand, in a state where the rod 55a is contracted, the engagement between the rod 55a and the stopper member 56 is released, and the upper support pillar 41 can be moved in the vertical direction.

The stopper member 56 is a member that is attached to an attachment portion 41b provided on a side surface of the upper support pillar 41 and receives the rod 55a of the lock cylinder 55. The stopper member 56 is a flat plate-shaped member, and has bolt holes opened in the thickness direction. In addition, the stopper member 56 receives the rod 55a of the lock cylinder 55 on the upper surface.

The stopper member 56 is exchangeably attached to the second side surface of the upper support pillar with a bolt (not illustrated) by selecting a member having an arbitrary height from a plurality of types having different heights in the vertical direction. For example, FIG. 6A is a view illustrating a stopper member 56a corresponding to the non-extended state in FIG. 3, and FIG. 6B is a view illustrating a stopper member 56b corresponding to the extended state in FIG. 4.

As illustrated in FIGS. 3 and 4, while the position of the lock cylinder 55 in the vertical direction is fixed by the support base 57, the position of the attachment portion 41b of the upper support pillar 41 changes in the vertical direction between the extended state and the non-extended state. Therefore, the dimension $h_2$ in the vertical direction of the stopper member 56b corresponding to the extended state is set shorter by the height h of the spacer member 54 than the dimension $h_1$ in the vertical direction of the stopper member 56a corresponding to the non-extended state. As a result, the upper surface of the stopper member 56 can be aligned with the position of the lock cylinder 55 in both the extended state and the non-extended state.

When attached to the upper support pillar 41, the upper surface of the stopper member 56 forms a wedge-shaped inclined surface that is inclined downward with distance from the side surface of the upper support pillar. As illustrated in FIGS. 3 and 4, when the rod 55a of the lock cylinder 55 stretches, the inclined surface of the stopper member 56 is pressed downward, while the stopper member 56 fixed to the upper support pillar 41 generates an upward reaction force, so that the upper support pillar 41 is strongly fixed.

<Description of Blow Molding Method>

Figure 7:
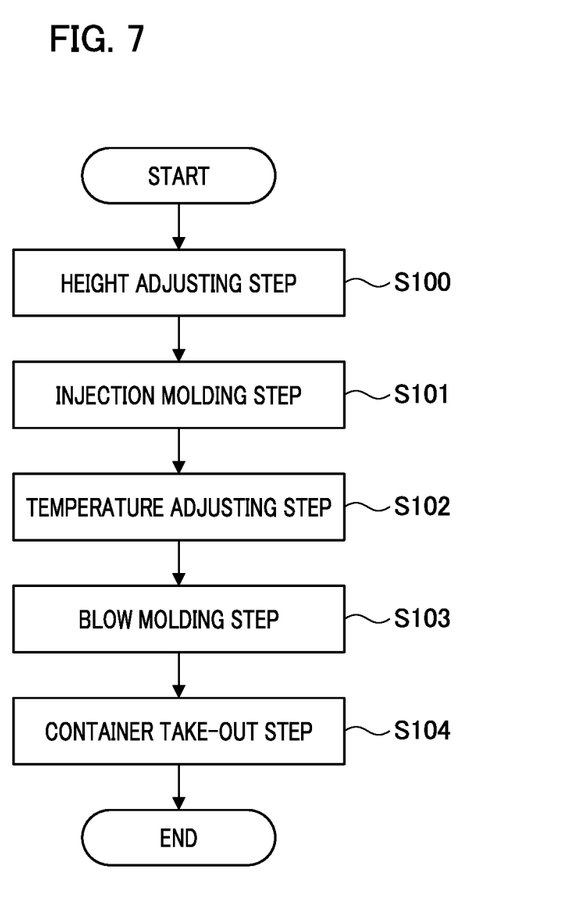
FIG. 7 is a flowchart showing steps of a blow molding method.

FIG. 7 is a flowchart illustrating steps of a blow molding method performed by the blow molding apparatus 1 according to the present embodiment. In the present embodiment, before each step (S101 to S104) to be described later of the blow molding method is performed, a height adjusting step (S100) of adjusting the interval in the vertical direction between the machine bed 2 and the upper base 3 is performed.

(Step S100: Height Adjusting Step)

The height adjusting step is a step of adjusting the interval in the vertical direction between the machine bed 2 and the upper base 3 according to the axial length of the preform 10 used for blow molding. In the following description, assuming a case where the preform 10 is switched from a preform having a long axial length to a preform having a short axial length, a case where the blow molding apparatus 1 is adjusted from the extended state illustrated in FIG. 4 to the non-extended state illustrated in FIG. 3 will be described.

First, the rod 55a of the lock cylinder 55 is contracted to release the fixation of the upper support pillar 41, and then the cylinder rod 51b of the hydraulic cylinder 51 is slightly expanded. As a result, the upper support pillar 41 moves upward with respect to the lower support pillar 42, and the spacer member 54 sandwiched between the upper support pillar 41 and the lower support pillar 42 can be removed.

Secondly, the spacer member 54 is removed from between the upper support pillar 41 and the lower support pillar 42. Further, the stopper member 56b attached to the upper support pillar 41 is replaced with a stopper member 56a corresponding to the non-extended state.

Third, the cylinder rod 51b of the hydraulic cylinder 51 is contracted to bring the lower end surface of the upper support pillar 41 and the upper end surface of the lower support pillar 42 into contact with each other, thereby bringing the support pillar 4 into a non-extended state. As a result, the interval in the vertical direction between the machine bed 2 and the upper base 3 is shortened by the height h of the removed spacer member 54. The stroke of the transport plate in the vertical direction is adjusted to a dimension suitable for advancing and retracting the preform having a short axial length.

Fourth, the rod 55a of the lock cylinder 55 is stretched to be engaged with the stopper member 56a. As a result, the position of the upper support pillar 41 in the vertical direction is fixed.

As described above, in the height adjusting step, the interval in the vertical direction between the machine bed 2 and the upper base 3 can be adjusted. The above example is merely an example, and in the height adjusting step, the height adjusting part 5 may be adjusted from the non-extended state to the extended state. Alternatively, the height adjustment may be performed by replacing the spacer member 54 with a different member so that the stroke of the transport plate 15 in the vertical direction has an appropriate dimension for advancing and retracting the switched preform.

When the height adjusting step is completed, each step of the blow molding method described below is performed.

(Step S101: Injection Molding Step)

First, in the injection molding part 11, a resin is injected from the injection device 17 into a preform-shaped mold space formed by the injection cavity mold 24, the injection core mold 23, and the neck mold 16 of the transport plate 15 to manufacture the preform 10.

In step S101, mold opening of the injection molding part 11 is performed immediately after the completion of the resin filling or after the minimum cooling time provided after the resin filling. That is, the preform 10 is released from the injection cavity mold 24 and the injection core mold 23 in a high temperature state in which the outer shape of the preform 10 can be maintained. Thereafter, the transport plate 15 rotates by a predetermined angle, and the preform 10 held by the neck mold 16 is conveyed to the temperature adjusting part 12.

Figure 8:
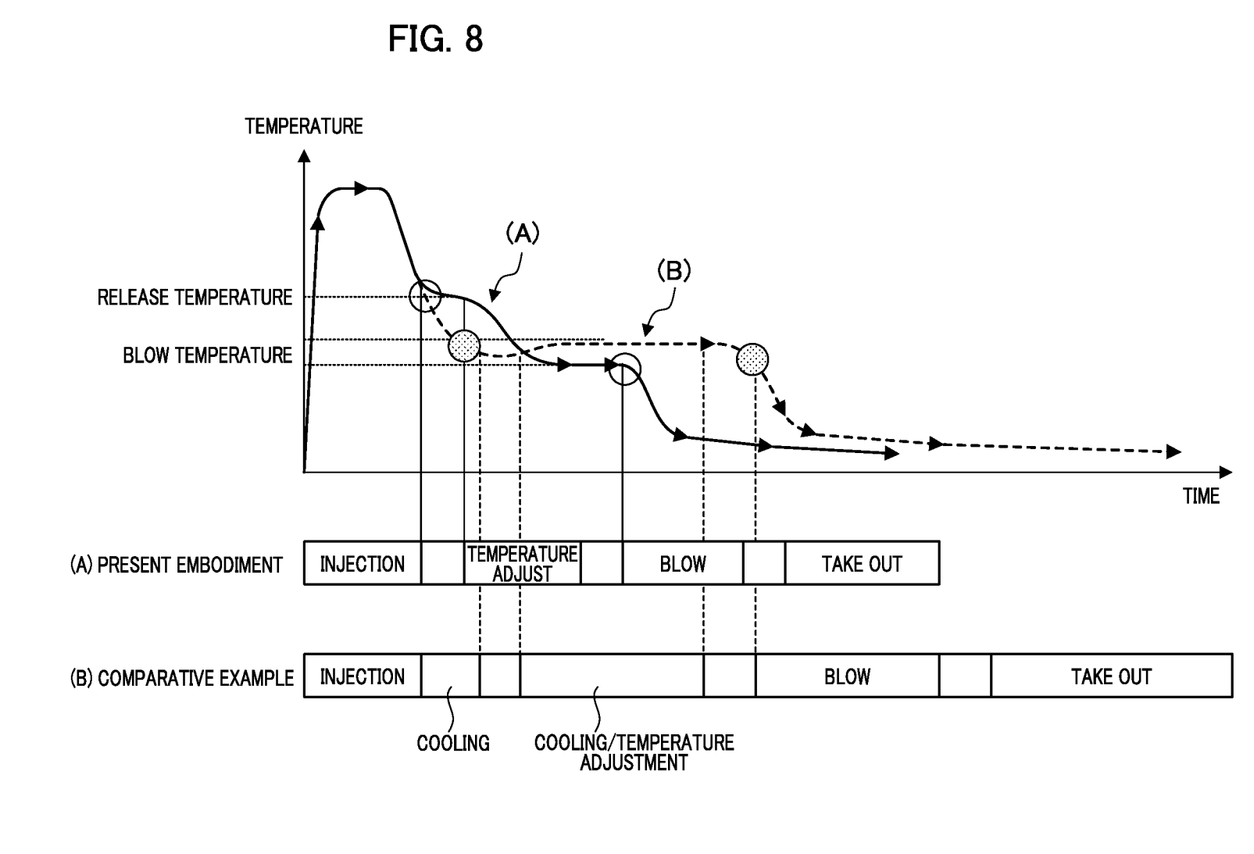
FIG. 8 is a graph showing an example of temperature change of a preform in the blow molding method of the present embodiment and a comparative example.

Here, a temperature change of the preform 10 in the blow molding method of the present embodiment will be described with reference to FIG. 8. The vertical axis in FIG. 8 represents the temperature of the preform 10, and the horizontal axis in FIG. 8 represents time. In FIG. 8, an example of temperature change of the preform of the present embodiment is illustrated in (A) of FIG. 8. An example of temperature change of the preform of comparative example (conventional method) described later is shown in (B) of FIG. 8. The blank between the respective steps is the time required to transport the preform 10 or the container, and is the same.

In the present embodiment, when the resin material is injection-molded at a temperature equal to or higher than the melting point of the resin material, only minimum cooling of the preform 10 after injection molding is performed in the injection molding part 11, and cooling and temperature adjustment of the preform 10 are performed in the temperature adjusting part 12. In the present embodiment, the time (cooling time) for cooling the resin material after completion of injection of the resin material in the injection molding part 11 is preferably ½ or less with respect to the time (injection time) for injecting the resin material. The time for cooling the resin material can be made shorter than the time for injecting the resin material depending on the weight of the resin material. The time for cooling the resin material is more preferably ⅖ or less, still more preferably ¼ or less, and particularly preferably ⅕ or less with respect to the time for injecting the resin material. Since the cooling time is significantly shortened as compared with the comparative example, the skin layer (surface layer in a solidified state) of the preform is formed to be thinner than before, and the core layer (inner layer in a softened or molten state) is formed to be thicker than before. That is, as compared with the comparative example, a preform having a large thermal gradient between the skin layer and the core layer and having high residual heat at a high temperature is formed.

In the present embodiment, the injection-molded preform 10 is released from the injection molding part 11 at a higher release temperature than in the comparative example, and is conveyed to the temperature adjusting part 12. With the movement to the temperature adjusting part 12, the temperature of the preform 10 is equalized by heat exchange (heat conduction) between the skin layer and the core layer. Further, the preform 10 is slightly cooled from the outer surface by the contact with the outside air. However, the temperature of the preform 10 is maintained at a substantially high release temperature until the preform is carried into the temperature adjusting part 12. In the temperature adjusting part 12, the temperature of the preform 10 is lowered from the high release temperature to the blow temperature, and then the temperature of the preform 10 is maintained at the blow temperature until blow molding is performed.

Here, due to the structure of the blow molding apparatus 1, the standby times of an injection molding step, a temperature adjusting step, a blow molding step, and a container take-out step are the same. Similarly, the conveyance time between the respective steps is the same.

The conveyance time between the respective steps includes a time for reciprocating the transport plate 15 in the vertical direction. In the present embodiment, the stroke of the transport plate 15 in the vertical direction is adjusted in advance to a dimension suitable for advancing and retracting the preform by the height adjusting step. Therefore, in the present embodiment, when the transport plate 15 is reciprocated in the vertical direction, the transport plate 15 does not need to be moved excessively.

On the other hand, as a comparative example, an example of temperature change of the preform ((B) of FIG. 8) when the preform 10 is cooled in the injection molding step will be described.

In the comparative example, the preform 10 is cooled to a temperature lower than or substantially equal to the blow temperature in the mold of the injection molding part 11. As a result, in the comparative example, the time of the injection molding step is longer than that in the present embodiment. Then, since the time of each step is set in accordance with the time of the longest injection molding step, the time of the molding cycle of the container becomes long as a result.

(Step S102: Temperature Adjusting Step)

Subsequently, the temperature adjusting part 12 performs temperature adjustment for bringing the temperature of the preform 10 close to a temperature suitable for the final blow.

In the temperature adjusting step, first, the preform 10 is accommodated in the preform-shaped conditioning space in the conditioning pot. Subsequently, a heating core capable of blowing air is introduced into the preform 10 accommodated in the conditioning pot, and cooling blow of the preform 10 is performed.

By the cooling blow in the temperature adjusting step, the preform 10 receives air pressure from the inside and continues to come into contact with the conditioning pot kept at a predetermined temperature. Therefore, in the temperature adjusting step, the temperature of the preform 10 is adjusted so as not to be equal to or lower than the blow temperature from the outside, and the nonuniform temperature generated during the injection molding is also reduced. Note that, since the conditioning pot has a preform-shaped space, the shape of the preform is maintained in the conditioning pot and does not greatly change.

After the temperature adjusting step, the transport plate 15 rotates by a predetermined angle, and the preform 10 after the temperature adjustment held in the neck mold 16 is conveyed to the blow molding part 13.

(Step S103: Blow Molding Step)

Subsequently, the blow molding of the container is performed in the blow molding part 13.

First, when the preform 10 is accommodated in the blow molding mold of the blow molding part 13, the blow molding mold is closed, and a mold space corresponding to the shape of the container is formed. Subsequently, a blow air introduction member (blow core) and a stretching rod are inserted into the preform 10, and the preform 10 is stretched in the axial direction by lowering of the stretching rod. Thereafter, the blow air is introduced into the preform 10 from the opening of the blow air introduction member. As a result, the preform 10 bulges so as to be in close contact with the blow molding mold and is blow-molded to a container.

(Step S104: Container Take-Out Step)

When the blow molding is completed, the blow molding mold is opened. Subsequently, the transport plate 15 rotates by a predetermined angle, and the container is conveyed to the take-out part 14. In the take-out part 14, the neck portion of the container is released from the neck mold 16, and the container is taken out to the outside of the blow molding apparatus 1.

Thus, the series of steps of the blow molding method is completed. Thereafter, by rotating the transport plate 15 by a predetermined angle, the respective steps of S101 to S104 described above are repeated.

Hereinafter, effects of the present embodiment will be described.

According to the blow molding apparatus 1 of the present embodiment, the interval in the vertical direction between the machine bed 2 and the upper base 3 can be adjusted by the height adjusting part 5 of the support pillar 4. By adjusting the interval in the vertical direction between the machine bed 2 and the upper base 3 according to the axial length of the preform 10 used for the blow molding, the stroke of the transport plate in the vertical direction when the preform is conveyed in each step of the blow molding becomes an appropriate dimension for advancing and retracting the preform.

The conveyance time between the respective steps of the blow molding includes a time for reciprocating the transport plate 15 in the vertical direction, and the longer the time, the longer the molding cycle of the container in the blow molding. When the interval in the vertical direction between the machine bed 2 and the upper base 3 is individually adjusted according to the axial length of the preform 10 as described above, the transport plate 15 does not need to be moved excessively when the transport plate 15 is reciprocated in the vertical direction, and the operation time of the machine and the molding cycle of the container are optimized.

In other words, according to the present embodiment, as compared with the case where the same preform 10 is used but the height adjustment is not performed, the time for reciprocating the transport plate 15 in the vertical direction is shortened, so that the molding cycle of the container can be speeded up.

Further, in the present embodiment, the position of the upper base 3 with respect to the machine bed 2 is fixed at the time of blow molding, and the transport plate 15 holding the preform 10 moves up and down in the vertical direction. As described above, in the present embodiment, the heavy upper base 3 supporting various components such as the injection core mold 23 and the stretching rod, and these drive mechanisms do not need to be moved up and down at the time of blow molding. That is, according to the configuration of the present embodiment, the load during the operation is reduced as compared with the configuration in which the upper base 3 is moved up and down during the blow molding, so that the power consumption of the blow molding apparatus 1 can be significantly suppressed. In addition, it is easy to stabilize the operation of the blow molding apparatus 1, and it is possible to easily cope with the speed-up of the molding cycle of the container.

The present invention is not limited to the above embodiments, and various improvements and design changes may be made without departing from the gist of the present invention.

For example, an air cylinder, a toggle elevation mechanism, a ball screw mechanism by an electric motor, or the like may be used as the drive part of the height adjusting part 5.

For example, the drive part of the height adjusting part 5 does not need to be provided in all the height adjusting parts. For example, in a range in which the upper base 3 can be stably moved in the vertical direction, a height adjusting part having no drive part may be disposed in some of the support pillars 4.

In addition, the position of the height adjusting part 5 in the blow molding apparatus 1 is not limited to the configuration of the above embodiment. For example, the height adjusting part 5 may be provided on the lower surface of the upper base 3.

In the above embodiment, the configuration example of the blow molding apparatus in which the upper base is supported by the plurality of support pillars erected on the machine bed and the transport plate moves up and down with respect to the machine bed has been described. However, in the present invention, in the blow molding apparatus in which the upper base holding the transport plate is moved up and down with respect to the machine bed by the lifting apparatus, the stroke of the upper base in the vertical direction with respect to the machine bed may be adjusted by the spacer.

The configuration of the height adjusting part 5 of the above embodiment is not limited to application to a hot parison type blow molding apparatus. For example, the height adjusting part 5 of the above embodiment may be applied to an injection molding apparatus used for manufacturing the preform 10 at a high speed.

Figure 9:
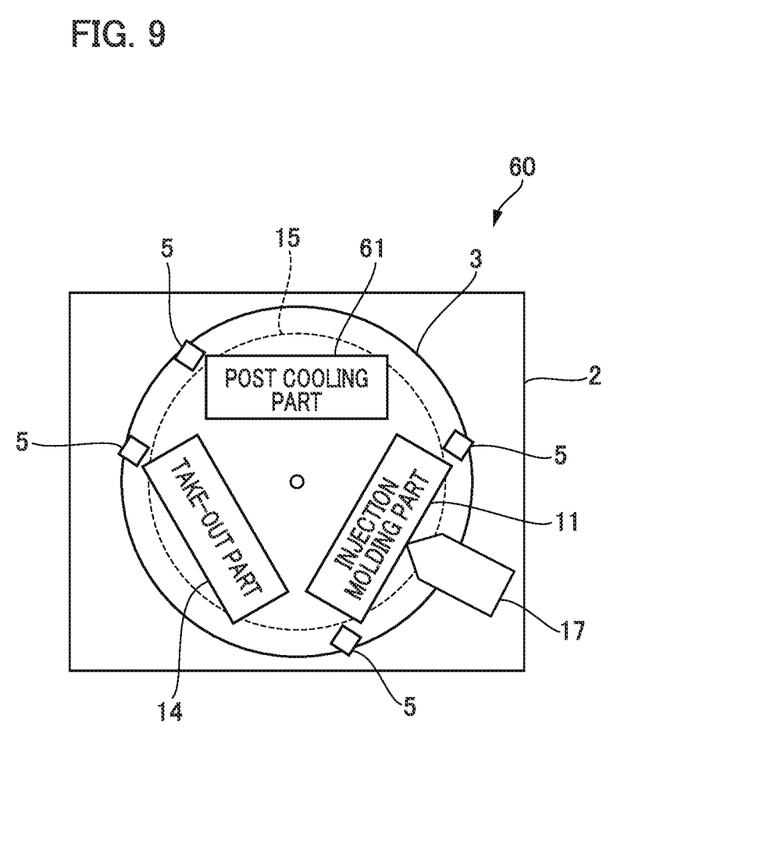
FIG. 9 is a view schematically illustrating a configuration of an injection molding apparatus.

FIG. 9 is a diagram schematically illustrating a configuration of an injection molding apparatus 60. The injection molding apparatus 60 in FIG. 9 is a apparatus used for manufacturing the preform 10 at a high speed, and corresponds to the blow molding apparatus 1 of the above embodiment excluding the blow molding part 13. Therefore, in the description of FIG. 9, the same components as those of the above embodiment are denoted by the same reference numerals, and redundant description is omitted.

The injection molding apparatus 60 includes a machine bed 2 and an upper base 3 disposed above the machine bed 2. The interval in the vertical direction (the direction perpendicular to the paper surface of FIG. 9) between the machine bed 2 and the upper base 3 can be adjusted by the height adjusting part 5. Further, the injection molding apparatus 60 includes an injection molding part 11, a post cooling part 61, a take-out part 14, and a transport plate 15 in a space between the machine bed 2 and the upper base 3. The post cooling part 61 has a configuration capable of cooling the preform in a short time to such an extent that the preform 10 can be discharged in a cured state by the take-out part 14, and is a kind of the temperature adjusting part 12 in a broad sense.

The injection molding part 11, the post cooling part 61, and the take-out part 14 are arranged at positions rotated by a predetermined angle (for example, 120 degrees) in the circumferential direction of the transport plate 15. The configuration of the transport plate 15 is the same as that of the above embodiment except that the rotation angle is different for each step.

In the injection molding apparatus 60, the preform 10 held by the neck mold 16 is conveyed through the injection molding part 11, the post cooling part 61, and the take-out part 14 in this order by the rotation of the transport plate 15.

In the injection molding apparatus 60, the post cooling part 61 is provided on the downstream side of the injection molding part 11, so that the post cooling part 61 can additionally cool the preform 10. By additionally cooling the preform 10 by the post cooling part 61, the preform 10 can be released from the injection molding part 11 even in a high temperature state as in the above-described embodiment, and the cooling time of the preform 10 in the injection molding part 11 can be significantly shortened. As a result, since the molding of the next preform 10 can be started early, the molding cycle time of the preform 10 in the injection molding apparatus 60 can be shortened.

Further, according to the injection molding apparatus 60, the stroke of the transport plate 15 in the vertical direction can be set to an appropriate dimension for advancing and retracting the preform by adjusting the interval in the vertical direction between the machine bed 2 and the upper base 3 by the height adjusting part 5. As a result, the time for reciprocating the transport plate 15 in the vertical direction is shortened, so that the molding cycle of the preform 10 can be speeded up.

It should be considered that the embodiment disclosed herein is illustrative in all respects and not restrictive. The scope of the present invention is indicated not by the above description but by the claims, and it is intended that meanings equivalent to the claims and all modifications within the scope are included.

The invention claimed is:

1. A blow molding apparatus, comprising:
   an injection molding part configured to injection-mold a resin preform having a bottomed shape;
   a blow molding part configured to blow-mold the preform to manufacture a resin container;
   a machine bed;
   an upper base disposed at intervals in a vertical direction from the machine bed and supported by a plurality of support pillars erected on the machine bed;
   a transport plate configured to rotate at a height position of the upper base to convey the preform between the injection molding part and the blow molding part;
   an elevation mechanism configured to move the transport plate up and down in the vertical direction with respect to a mold disposed on the machine bed; and
   a height adjusting part provided at each of the plurality of support pillars and configured to adjust a stroke of the transport plate or the upper base in the vertical direction with respect to the machine bed by adjusting an interval in the vertical direction between the machine bed and the upper base.

2. The blow molding apparatus according to claim 1, wherein each of the height adjusting parts include a drive part configured to move a respective one of the plurality of support pillars in the vertical direction.

3. The blow molding apparatus according to claim 2, wherein each of the height adjusting parts include a guide part configured to guide the respective one of the plurality of support pillars moved by the drive part along the vertical direction.

4. The blow molding apparatus according to claim 1, wherein a spacer member configured to maintain an interval in the vertical direction between the machine bed and the upper base is exchangeably attached to each of the height adjusting parts.

5. The blow molding apparatus according to claim 1, wherein each of the height adjusting parts include a locking part configured to fix a position of a respective one of the plurality of support pillars after the interval adjustment.

6. The blow molding apparatus according to claim 1, further comprising a temperature adjusting part configured to adjust a temperature of the preform manufactured by the injection molding part before the blow molding part.

7. A blow molding method using the blow molding apparatus according to claim 1, the method comprising:
  performing, by the height adjusting part, an adjustment a stroke of the transport plate in a vertical direction with respect to the machine bed as a height adjusting;
  injection-molding the preform after the height adjusting; and
  blow-molding the preform to manufacture a resin container after the height adjusting.

8. The blow molding method according to claim 7, wherein
  in the height adjusting, adjusting an interval in the vertical direction between the machine bed and the upper base based on an axial length of the preform.

9. The blow molding method according to claim 7, further comprising:
  performing, before the blow molding, an adjustment a temperature of the preform manufactured in the injection molding.

* * * * *